United States Patent
Tondreau et al.

(10) Patent No.: US 7,393,455 B1
(45) Date of Patent: Jul. 1, 2008

(54) METHOD AND APPARATUS FOR FILTERING PRESSURIZED FUEL

(75) Inventors: Alfred Tondreau, Saline, MI (US); Kevin J. Rucinski, Saline, MI (US)

(73) Assignee: Davco Technology, L.L.C., Saline, MI (US)

( * ) Notice: Subject to any disclaimer, the term of this patent is extended or adjusted under 35 U.S.C. 154(b) by 418 days.

(21) Appl. No.: 10/813,828

(22) Filed: Mar. 31, 2004

Related U.S. Application Data (60) Provisional application No. 60/459,015, filed on Mar. 31, 2003.

(51) Int. Cl.
*B01D 27/08* (2006.01)
*B01D 27/10* (2006.01)
(52) U.S. Cl. .................. 210/767; 210/95; 210/130; 210/440
(58) Field of Classification Search ............. 210/94–95, 210/130–133, 440, 767
See application file for complete search history.

(56) References Cited

U.S. PATENT DOCUMENTS

| 3,508,657 | A | * | 4/1970 | Cooper ..................... 210/90 |
| 6,039,030 | A | * | 3/2000 | Robinson et al. ............ 123/457 |
| 6,641,742 | B2 | * | 11/2003 | Prater et al. ................. 210/767 |
| 6,841,065 | B2 | * | 1/2005 | Smith et al. .................. 210/94 |
| 6,939,464 | B1 | * | 9/2005 | Jiang et al. .................. 210/232 |

* cited by examiner

*Primary Examiner*—Terry K Cecil
(74) *Attorney, Agent, or Firm*—Young Basile (57) ABSTRACT

A method and apparatus for filtering pressurized fluids, wherein a fluid level provides a visual indicator as to the general condition of the filter element. The present invention provides a vertical housing having a fluid inlet for communicating the fluid into said housing and a fluid outlet for communicating the fluid downstream of the housing. A filter element is disposed within the housing between the fluid inlet and the fluid outlet for filtering the fluid. The volume of air within the vertical housing is specifically determined in order to maintain a level of fluid which will indicate the general condition of the filter element.

18 Claims, 5 Drawing Sheets

FILTER IN HOUSING

| VOLUME 1 – LARGE VOLUME | | |
|---|---|---|
| CLEARANCE | 0.5 | INCH |
| SMALL DIA | 3.82 | INCH |
| LARGE DIA | 4.82 | INCH |
| HEIGHT | 3.25 | INCH |
| VOLUME 1 | 22.05 | CUBIC INCH |
| VOLUME 1 | 0.36 | LITERS |

| VOLUME 2 – SMALL VERTICAL VOLUME | | |
|---|---|---|
| CLEARANCE | 0.15 | INCH |
| SMALL DIA | 3.82 | INCH |
| LARGE DIA | 4.12 | INCH |
| HEIGHT | 1.5 | INCH |
| VOLUME 1 | 2.81 | CUBIC INCH |
| VOLUME 1 | 0.05 | LITERS |

| VOLUME 3 – VOLUME ABOVE FILTER | | |
|---|---|---|
| LARGE DIA | 4.12 | INCH |
| HEIGHT | 0.2 | INCH |
| VOLUME 1 | 2.67 | CUBIC INCH |
| VOLUME 1 | 0.009 | LITERS |

| TOTAL VOLUME = | 0.42 | LITERS |
|---|---|---|

AIR VOLUME & HEIGHT CALCULATIONS

| INITIAL NEW FILTER – NO FUEL | | |
|---|---|---|
| P1 = | 1 | atm |
| T1 = | 294 | K |
| V1 = | 0.42 | LITER |

| CLEAN AT SYSTEM PRESSURE | | |
|---|---|---|
| P2 = | 116 | PSI |
| P2 = | 7.888 | atm |
| T2 = | 333 | K |
| V2 = | 0.0597528 | LITERS |
| V2 = | 3.646298 | CUBIC INCH |
| HEIGHT BELOW TOP | | |

| SEEING IS BELIEVING END POINT | | |
|---|---|---|
| P3 = | 188 | PSI |
| P3 = | 12.784 | atm |
| T3 = | 333 | K |
| V3 = | 0.066868 | LITERS |
| V3 = | 2.249848 | CUBIC INCH |
| HEIGHT BELOW TOP | | |

| DIFFERENCE IN HEIGHT | | INCHES |
|---|---|---|

FIG. 6

FILTER IN HOUSING

| VOLUME 1 – LARGE VOLUME | | |
|---|---|---|
| CLEARANCE | 0.375 | INCH |
| SMALL DIA | 3.82 | INCH |
| LARGE DIA | 4.57 | INCH |
| HEIGHT | 2.75 | INCH |
| VOLUME 1 | 13.59 | CUBIC INCH |
| VOLUME 1 | 0.22 | LITERS |

| VOLUME 2 – SMALL VERTICAL VOLUME | | |
|---|---|---|
| CLEARANCE | 0.1 | INCH |
| SMALL DIA | 3.82 | INCH |
| LARGE DIA | 1.02 | INCH |
| HEIGHT | 2 | INCH |
| VOLUME 1 | 2.46 | CUBIC INCH |
| VOLUME 1 | 0.04 | LITERS |

| VOLUME 3 – VOLUME ABOVE FILTER | | |
|---|---|---|
| LARGE DIA | 4.02 | INCH |
| HEIGHT | 0.2 | INCH |
| VOLUME 1 | 2.54 | CUBIC INCH |
| VOLUME 1 | 0.01 | LITERS |

AIR VOLUME & HEIGHT CALCULATIONS

| INITIAL NEW FILTER – NO FUEL | | |
|---|---|---|
| $P_1 =$ | 1 | atm |
| $V_1 =$ | 0.27 | LITERS |

| CLEAN AT SYSTEM PRESSURE | | |
|---|---|---|
| $P_2 =$ | 60 | PSI |
| $P_2 =$ | 4.08 | atm |
| $V_2 =$ | 0.066518 | LITERS |
| $V_2 =$ | 4.059198 | CUBIC INCH |
| HEIGHT BELOW TOP | 2 INCHES | |

| SEEING IS BELIEVING END POINT | | |
|---|---|---|
| $P_3 =$ | 80 | PSI |
| $P_3 =$ | 5.44 | atm |
| $V_3 =$ | 0.049889 | LITERS |
| $V_3 =$ | 3.044398 | CUBIC INCH |
| HEIGHT BELOW TOP | FULL - AT TOP | |

| DIFFERENCE IN HEIGHT | 2 | INCHES |
|---|---|---|

FIG.7

METHOD AND APPARATUS FOR FILTERING PRESSURIZED FUEL

The following is a formalization of U.S. Provisional Application Ser. No. 60/459,015 filed Mar. 31, 2003.

FIELD OF THE INVENTION

The present invention relates to fluid filter assemblies, and more particularly, a diesel fuel or oil filter assembly that operates under high pressure while providing a visual indicator as to the general condition of the filter element.

BACKGROUND OF THE INVENTION

Past fuel filter assembly designs have provided the user with a rough but usable estimate of the condition of the filter element as a function of the height of the fuel level in an upper filter chamber of the fuel filter assembly during operation of the engine. In these designs, fuel moves from a lower chamber of the fuel filter assembly, through a passage, to the upper chamber of the fuel filter assembly. The fuel passes through a cylindrical filter element and out to the engine through an opening at the lower center of the upper chamber. An opaque or transparent cover of the upper filter chamber allows the user to view the fuel level within the upper chamber of the fuel filter assembly so that the user may use the fluid level within the upper chamber as a rough estimate as to the condition of the filter element.

Generally speaking, the fuel level tends to rise in the upper chamber as the filter element becomes more and more clogged from the bottom of the filter element to the top of the filter element. When the fuel level reaches the top of the filter element in normal operation, this may be taken as the time to consider changing the filter element.

Such fuel filter systems generally run by vacuum, that is, a fuel pump is positioned downstream of the fuel filter assembly, such that the pump is pulling or drawing fuel through the fuel filter assembly. When the fuel pump is placed upstream from the fuel filter assembly, the system is pressurized, and the fuel level within the upper chamber of the fuel filter assembly does not respond in the same manner as the system under vacuum. During low pressure applications, the fuel level may respond in a manner whereby the fuel level can be used to estimate the condition of the filter element. However, under high pressure applications, the fuel level within the upper chamber of the fuel filter assembly rises to the top of the upper chamber immediately, and therefore, does not provide the benefit of having the fuel level provide an estimate as to the condition of the filter element. The inability to run such fuel filter assemblies under high pressure applications reduces the flexibility and applications by which such fuel filter assemblies may be utilized.

It would be desirable to provide a fuel filter assembly that could be used under high pressure applications while still providing the benefits of having the fuel level in the upper chamber of the fuel filter assembly provide an indicator as to the general condition of the filter element.

BRIEF DESCRIPTION OF THE DRAWINGS

The description herein makes reference to the accompanying drawings wherein like referenced numerals refer to like parts throughout the several views and wherein.

DESCRIPTION OF THE PREFERRED EMBODIMENT

Referring to the drawings, the present invention will now be described in detail with reference to several illustrative embodiments thereof.

FIGS. 1-4 show a fluid filter assembly 10 of the present invention for use in high pressure applications. The fluid filter assembly 10 is ideally suited for filtering and processing diesel fuel and motor oils, but the fluid filter assembly 10 may also be utilized with other fluids, such as gasoline, water, coolant, etc. The fluid filter assembly 10 is mounted vertically upright by two mounting brackets 11. The fuel filter assembly 10 provides a closed cylindrical housing 12 having a lower fluid storage chamber (not shown) in diesel fuel applications and a base 14 for motor oil applications. An upper filter chamber 16 is threadingly connected to the base 14 or lower storage chamber and is preferably made of a transparent or opaque plastic. A fluid inlet 18 allows fluid to enter the base 14, and from there, the fluid flows upward to the upper chamber 16. A cylindrical filter element 20 is housed within the upper chamber 16 of the housing 12 for filtering the fluid and passing it to a fluid outlet 22. A relief valve 24 is mounted in the top of the filter element 20 and is designed to open when the pressure level across the filter element 20 reaches a predetermined level. The relief valve 24 becomes operative only after the filter element 20 becomes substantially clogged, causing the pressure differential across the filter element 20 to rise. The relief valve 24 provides a route for fuel to reach the fluid outlet 22 even though the filter element 20 is clogged. Although not specifically shown, the addition of a secondary filter element may be utilized either upstream or downstream of the relief valve 24.

To filter contaminants from the fluid, the filter element 20 provides a filter media 21 fabricated from a pleated porous paper material. The filter media 21 encircles a central filter tube 26, and a fuel impervious plastic cover 28 encircles the outer diameter of the filter media 21. A plurality of apertures 30 extend through the plastic cover 28 in a lower portion of the filter element 20. The apertures 30 in the plastic cover 28 allow fuel to pass through the plastic cover 28 to wet the filter media 21. The ends of the plastic cover 28 and the filter media 21 are contained by top and bottom end caps 32, 34, respectively. The top and bottom end caps 32, 34 are sealed to the edges of the plastic cover 28 and filter element 20 to preclude any possible leak at the ends of the filter element 20. A flexible seal 36 is provided on the bottom end cap 34 of the filter element 20 to create a seal between the central filter tube 26 and an inner core 38 of the filter element 20 to ensure that unfiltered fluid does not leak into or escape through the fluid outlet 22. The filter media 21 is preferably pleated or concentrically wound but may also be arranged in any of the ways known to one familiar with filtration construction so as to direct the fluid through the filter element 20. In addition, the filter element 20 may be fabricated from a hydrophobic filter material to filter out water from the fluid.

To maintain or relieve the pressure in the upper filter chamber 16 of the housing 12, the relief valve 24 is mounted in the top end cap 32 of the filter element 20, as seen in FIGS. 1-4 and 8. The top end cap 32 is fabricated from a thin metallic material having a shape complementary to the top of the filter element 20. The top end cap 32 has a substantially circular configuration with side walls 40 that extend downward from its periphery to sealingly connect to and cover the top of the filter media 21. The top end cap 32 also has a centrally located recessed portion which is received by and complementarily engages the inner core 38 of the filter element 20. A compression spring 46 is seated underneath the bottom end cap 34. A threaded cap 48 threadingly engages a threaded aperture 50 provided in the upper chamber 16 and forces the filter element 20 against the compression spring 46 to maintain the position of the filter element 20. The threaded cap 48 may also be removed to vent the fluid filter assembly 10 in order to drain the fluid from the fluid filter assembly 10. The threaded cap 48 may also be removed to prime the fluid filter assembly 10 by pouring fluid through the aperture 50 and into the fluid filter assembly 10 prior to threading the cap 48 back into the housing 12.

In order to have the fluid level in the upper chamber 16 of the fuel filter assembly 10 provide an indication as to the general condition of the filter element 20 under high pressure applications, the spacing between the outer circumference of the fluid impervious cover 28 of the filter element 20 and the inner periphery of the upper chamber 16 becomes critical. The fluid level in the upper chamber 16 of the fluid filter assembly 10 remains an indicator of the general condition of the filter element 20 by having a pocket of trapped air in the upper chamber 16 of the fluid filter assembly 10. This pocket of trapped air must maintain a certain level of pressure in order to prevent the fluid level from rising when the filter element 20 is not sufficiently clogged. When the filter element 20 begins to become clogged, the fluid pressure rises thereby compressing the air and increasing the air pressure.

Figure 1:
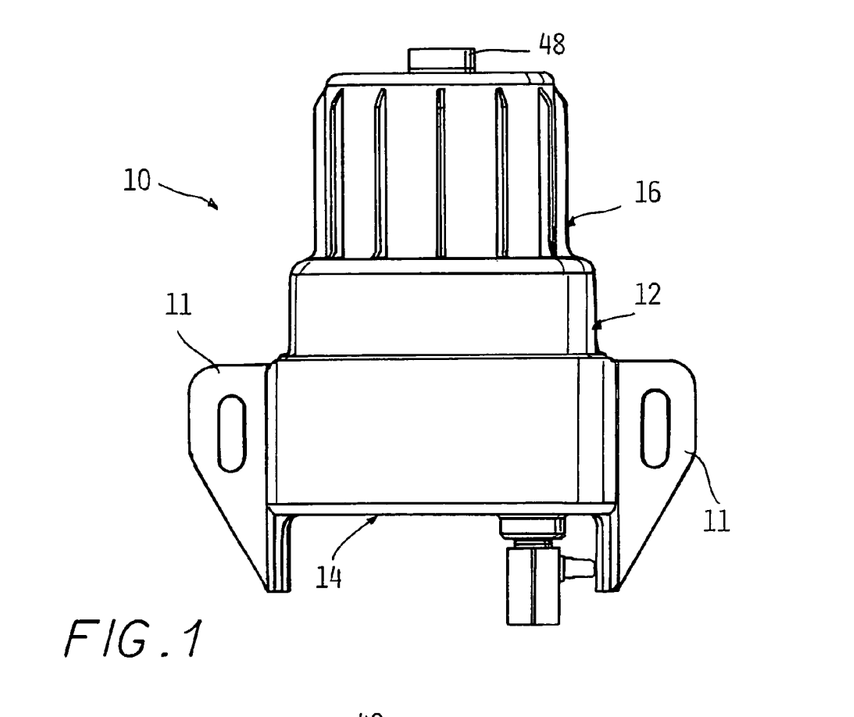
FIG. 1 is a front view showing the fuel filter assembly of the present invention.
Figure 2:
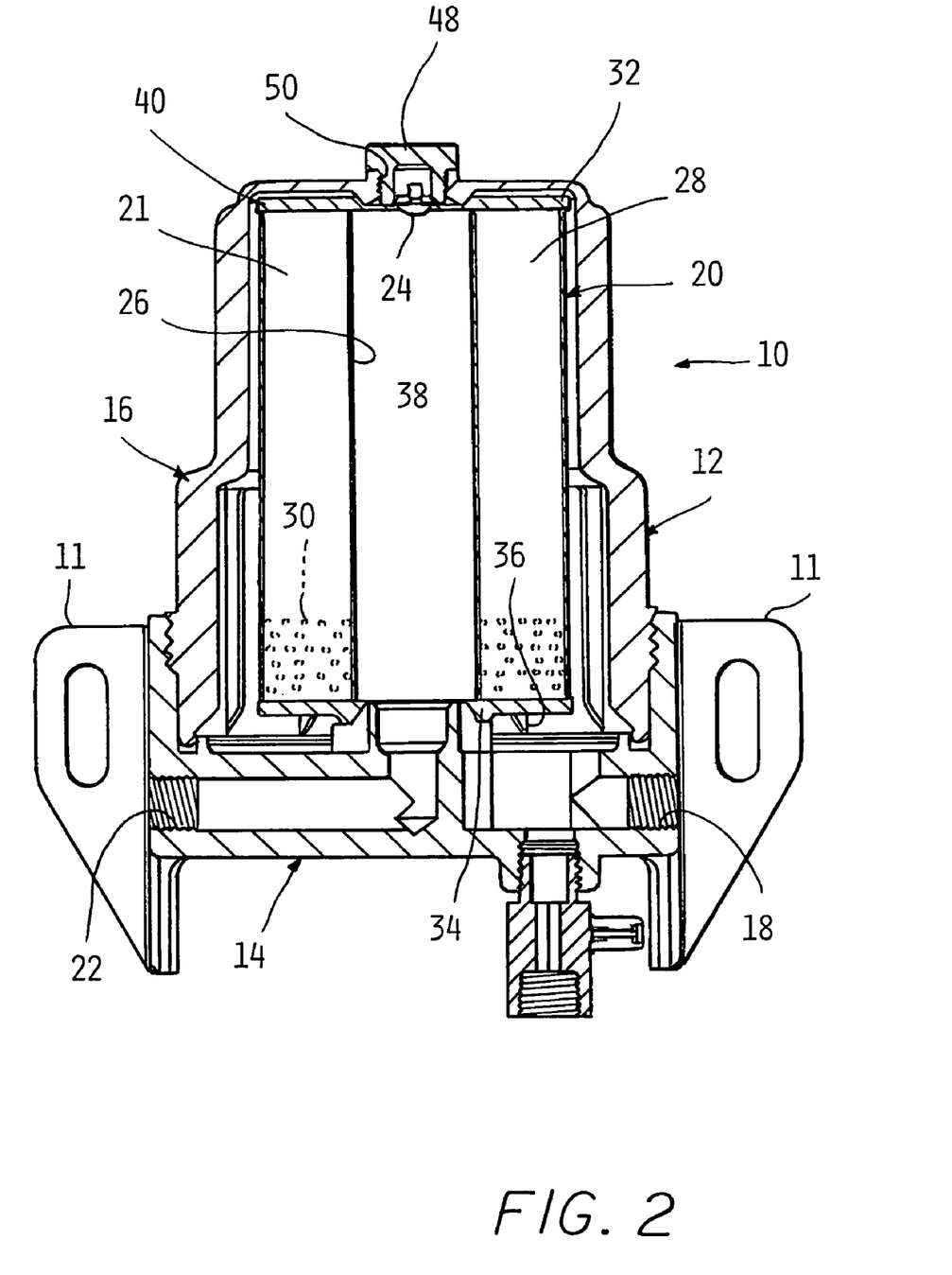
FIG. 2 is a sectional front view of the fuel filter assembly of the present invention.
Figure 3:
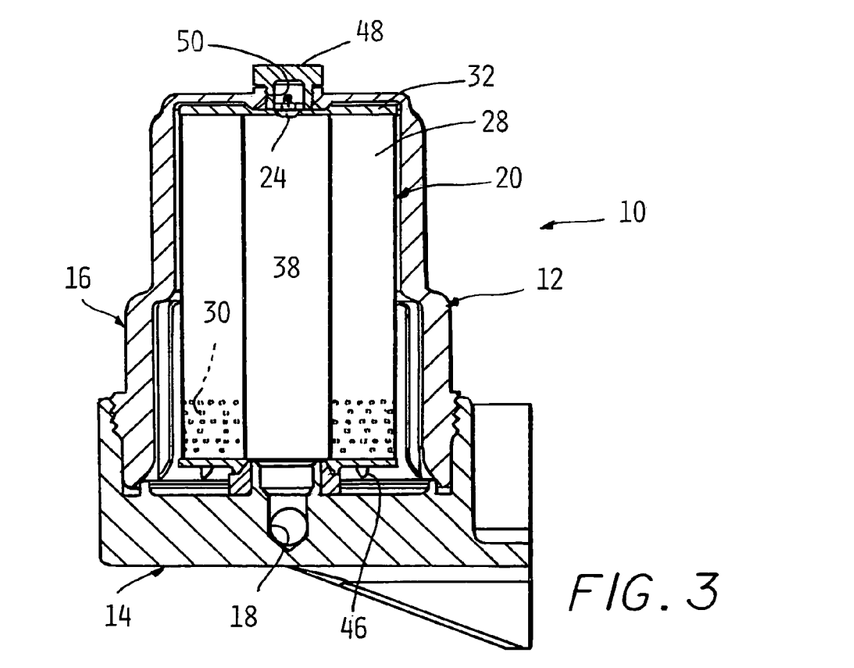
FIG. 3 is a sectional side view showing the fuel filter assembly of the present invention.
Figure 4:
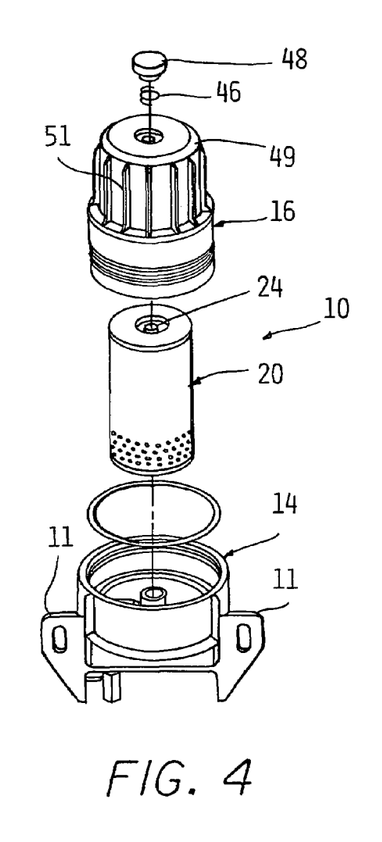
FIG. 4 is an exploded view showing the fuel filter assembly of the present invention.
Figure 5:
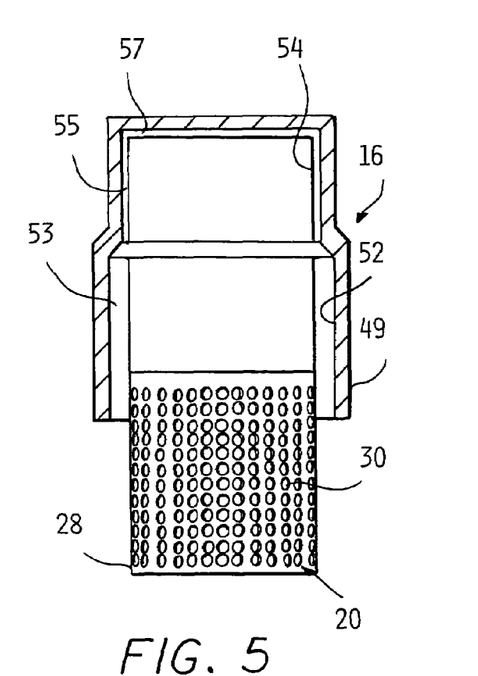
FIG. 5 is a schematic diagram showing the dimensional relationship between the filter element and the upper chamber of the fuel filter assembly of the present invention.

As seen in FIG. 5, the structure of the upper chamber 16 is designed to accommodate this formation of trapped air. The upper chamber 16 is fabricated from a hard, transparent plastic cover 49 having structural ribs 51 to support the cover 49 under high pressure applications. The cover 49 has a larger, inner diameter 52 at a bottom portion of the upper chamber 16 and a smaller, inner diameter 54 at an upper portion of the upper chamber 16. The spacing between the different diameters 52, 54 of the cover 49 of the upper chamber 16 and the fluid impervious cover 28 of the filter element 20 is critical as this determines the volume of air provided within the upper chamber 16. The potential volume of air required is determined from the space provided just above the apertures 30 in the plastic cover 28 of the filter element 20, since air is allowed to pass through the apertures 30 if the fluid extends below the apertures 30 provided in the plastic cover 28 of the filter element 20.

Figure 6:
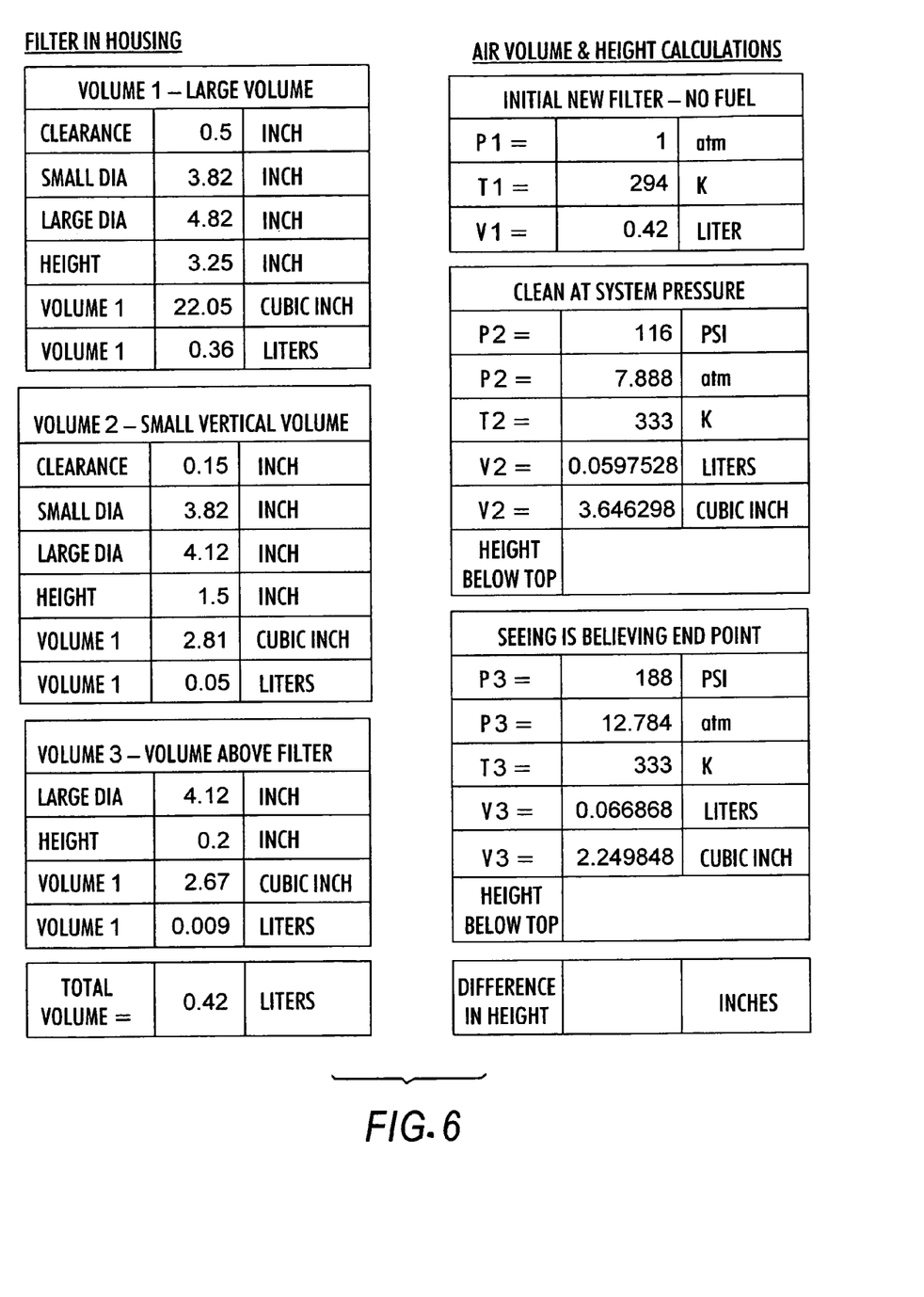
FIG. 6 is a specification chart showing the dimensional and performance characteristics of the fuel filter assembly of the present invention when used for diesel fuel.
Figure 7:
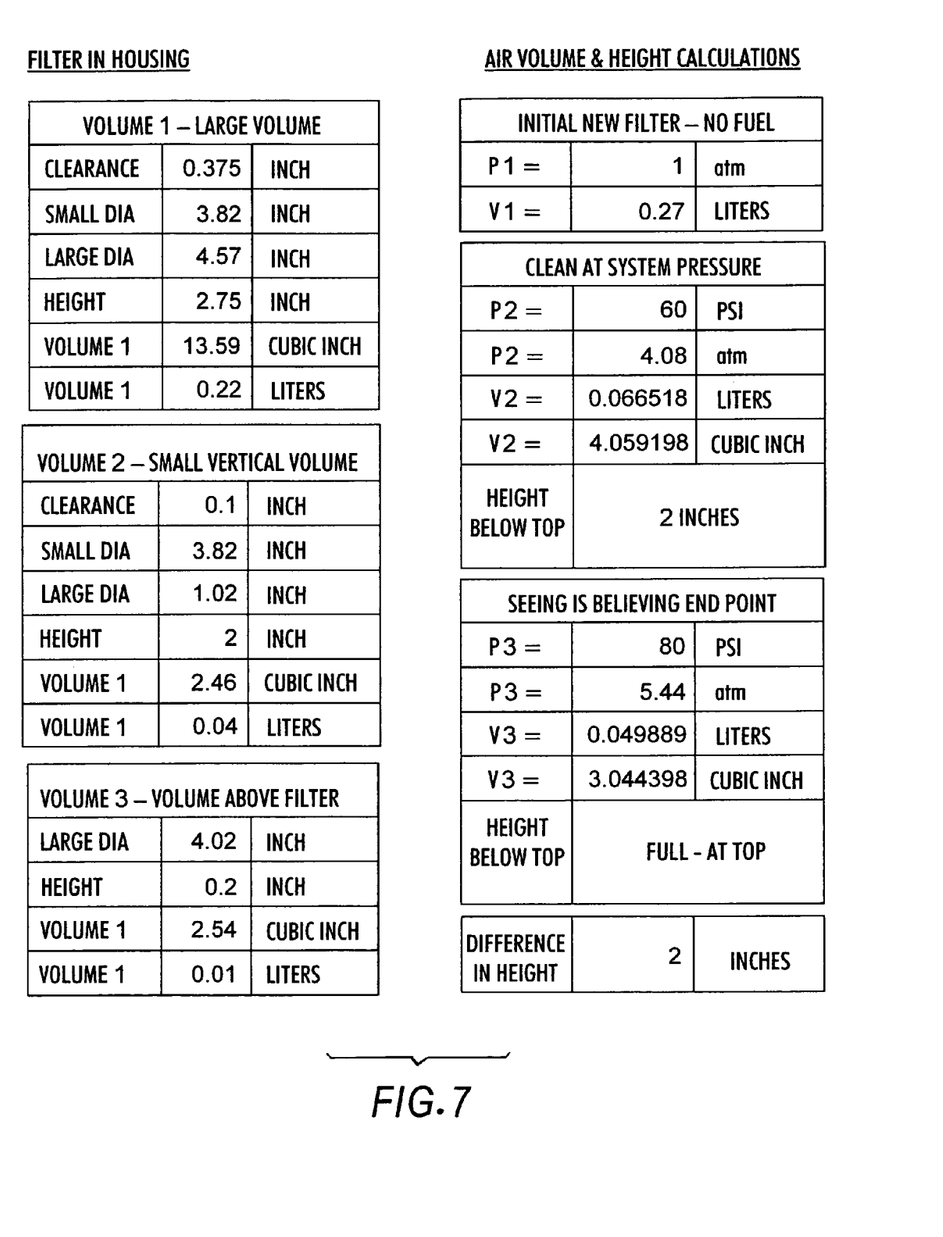
FIG. 7 is a specification chart showing the dimensional and performance characteristics of the fuel filter assembly of the present invention when used with motor oil.

As seen in FIGS. 6-7, the volume of air required in the upper chamber 16 to maintain the effect of the fluid level acting as an indicator to the general condition of the filter element 20 is dependent on the operating pressure of the system. These theories are confirmed by the experimental data shown in FIGS. 6-7. In a high pressure system utilizing a conventional diesel fuel as the fluid, as seen in FIG. 6, the system operates at approximately 116 psi when the filter element 20 is clean and at approximately 188 psi when the filter element 20 is ready to be replaced. Through the use of the relationship, PV=nRT (ideal gas law, where P=pressure, V=volume, n=number of molecules, R=gas constant, and T=temperature), and the manufacturing tolerances for the upper chamber 16, the spacing between the cover 28 of the filter element 20 and the inner diameter of the upper chamber 16 can be determined. FIGS. 5-6 show that volume 1 53, the large volume, is created by having the cover 28 of the filter element 20 having an outer diameter of substantially 3.82 inches and the inner diameter of the upper chamber 16 having a diameter of substantially 4.82 inches thereby providing a clearance of substantially 0.5 inches. The height at these diameters is substantially 3.25 inches to provide a volume of substantially 22.05 cubic inches.

Volume 2 55, the small vertical volume, is determined by having the outer diameter of the cover 28 of the filter element 20 be substantially 3.82 inches while the inner diameter of the upper chamber 16 is substantially 4.12 inches, thereby creating a clearance of substantially 0.15 inches. The height of the upper chamber's diameter is substantially 1.5 inches, thereby creating a volume of substantially 2.81 cubic inches.

Volume 3 57, the volume above the filter element 20, has an inner diameter of the upper chamber 16 of substantially 4.12 inches and a height of substantially 0.2 inches. This provides a volume of substantially 2.67 cubic inches for volume 3 57. The total of volumes 1 53, 2 55, and 3 57 is substantially 27.75 cubic inches.

When the filter media 21 is clean, the fuel level rises to the level at which the diameters of the upper chamber 16 change sizes, i.e. up to volume 2 55, as the air in volume 3 57 is compressed into volumes 2 55 and 1 53. This occurs because the volume of air must reach a certain level of pressure to prevent the fluid level from rising to the top of the upper chamber 16. When the filter element 20 is clean, the system operates at substantially 116 psi while the volume of air is substantially 3.65 cubic inches. As the filter media 21 begins to clog, the fuel level rises and begins to compress the air in volumes 1 53 and 2 55. Since the pressure and volume are determined by PV=nRT, wherein nRT is essentially constant, we know that $P_1V_1=P_2V_2$, wherein $P_1V_1$ is the pressure and volume when the filter element 20 is clean, and $P_2V_2$ is the pressure and volume when the filter element 20 is clogged. When the filter element 20 is clogged, the pressure rises to substantially 188 psi, and the volume is substantially 2.25 cubic inches. When the pressure within volumes 1 and 2 exceeds a predetermined level approximate to that of substantially 188 psi, the relief valve 24 opens, thereby allowing air to escape through the relief valve 24 and allowing the fluid level to rise. The relief valve 24 immediately closes upon the pressure level dropping below the predetermined pressure level.

As previously stated, the volume of air in the upper chamber 16 required to have the fluid level indicate the general condition of the filter element 20 is dependent on the operating pressure of the system. FIGS. 5 and 7 show the volume of air required in the upper chamber 16 for an oil filter system which operates at substantially 60 psi when the filter media 21 is clean and operates at substantially 80 psi when the filter element 20 is ready to be replaced. Volume 1 53, the large volume, provides a filter element 20 with an outer diameter of substantially 3.82 inches and an inner diameter of the upper chamber 16 having a diameter of substantially 4.57 inches for a clearance of substantially 0.375 inches. The height of the upper chamber 16 at these diameters is substantially 2.75 inches for a volume of substantially 13.59 cubic inches.

Volume 2 55, the small vertical volume, provides the filter element 20 with an outer diameter of substantially 3.82 inches and an inner diameter of the upper chamber 16 of substantially 4.02 inches for a clearance of substantially 0.1 inches. The height of the upper chamber 16 at these diameters is substantially 2 inches which provides a volume of substantially 2.46 cubic inches.

Volume 3 57, the volume above the filter element 20, has an inner diameter of the upper chamber 16 of substantially 4.02 inches at a height of substantially 0.2 inches for a volume of substantially 2.54 cubic inches. The total of volumes 1 53, 2 55, and 3 57 is substantially 18.59 cubic inches.

Again, when the filter media 21 is clean, the oil level will start at a level approximating a point at which the inner diameter of the upper chamber 16 changes size thereby forcing the air to compress from volumes 3 57 to volumes 1 53 and 2 55. Thus, when the filter element 20 is clean, the system pressure is substantially 60 psi, and the volume is substantially 4.06 cubic inches. As the filter element 20 begins to clog, the fluid level will rise, thereby compressing the volume of air in the upper chamber 16. When the filter element 20 is clogged, the pressure rises to substantially 80 psi, and the volume is reduced to substantially 3.04 cubic inches. When the pressure level within the upper chamber 16 exceeds a predetermined level, such as substantially 80 psi, the relief valve 24 will open, thereby allowing some of the trapped air to escape. The relief valve 24 will immediately close upon the pressure level dropping below the predetermined level.

Figure 8:
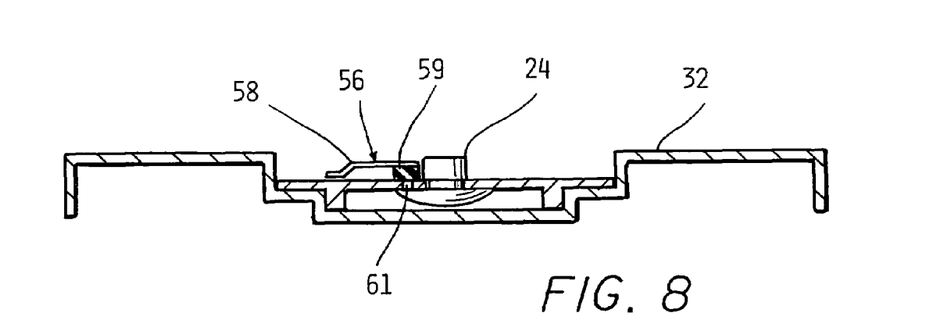
FIG. 8 is a sectional view of the relief valve and thermocouple valve of the fluid filter assembly of the present invention.

In extremely cold conditions, the fluid filter assembly 10 may see a rise in the pressure within the upper chamber 16 due to the rise in the viscosity of the fluids. Such a rise in the pressure level may cause the relief valve 24 to open, thereby releasing the air within the upper chamber 16 which is needed to maintain the fuel level at a proper level when the temperature of the fuel filter assembly 10 rises to normal levels. The pressure level will drop as the temperature of the fluid increases with the operation of the vehicle. In order to prevent this unwanted loss of air within the upper chamber 16, a thermal couple valve 56 is utilized to prevent the relief valve 24 from unnecessarily opening, as seen in FIG. 8. The thermal couple valve 56 provides a thermal sensitive strip of material 57 mounted adjacent the relief valve 24. A seal 59 mounted at the end of the thermal couple material 57 engages the aperture utilized to allow fluid to pass through the relief valve 24. In extremely cold weather, the thermal couple valve 56 remains in the closed position shown in FIG. 8 so as to prevent the relief valve 24 from allowing air to pass through the aperture 61 of the relief valve 24. When the temperature of the system rises to relatively normal levels, the thermal couple material 57 straightens out and allows the seal 59 on the end of the thermal couple strip 57 to lift off the aperture 61 of the relief valve 24. Air is then allowed to pass through the aperture 30 when the relief valve 24 opens in response to a predetermined level of pressure.

In operation, the fluid level within the fluid filter assembly 10 rises to a level within the upper chamber 16 where the larger diameter 52 and the smaller diameter 54 of the upper chamber 16 meet. As the fuel level rises to that beginning level, the air within the upper chamber 16 is compressed into volumes 2 55 and 3 57. As the filter media 21 clogs, the level of fluid in the upper chamber 16 rises thereby compressing the air further. When the pressure reaches a predetermined level, the relief valve 24 opens thereby allowing air to escape from the upper chamber 16 until the pressure within the upper chamber 16 drops below the predetermined pressure level. When the fluid rises to the top of the upper chamber 16, the filter element 20 may be replaced.

While the invention has been described in connection with what is presently considered to be the most practical and preferred embodiment, it is to be understood that the invention is not to be limited to the disclosed embodiments, but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for filtering a highly pressurized fluid, wherein the fluid is pressurized by a pump upstream of said apparatus, comprising:

a vertical housing having a transparent outer cover, a fluid inlet for communicating a highly pressurized fluid into said housing, and a fluid outlet for communicating said highly pressurized fluid downstream of said housing;

a filter element disposed within said housing between said fluid inlet and said fluid outlet for filtering said fluid;

a cover disposed on said filter element to define a fluid impervious region of said filter element adjacent to a top end of said filter element and a fluid permeable region of said filter element adjacent to a bottom end of said filter element;

a relief valve mounted in a top of said filter element, and said relief valve opening at a predetermined pressure;

said outer cover of said housing having a bottom portion with a substantially continuous first inner diameter defined throughout said bottom portion wherein said bottom portion of said outer cover extends at least from said bottom end of said filter element to said fluid impervious region of said filter element to define a lower predetermined volume between said bottom portion of said outer cover and said filter element; and said outer cover of said housing having an upper portion with a substantially continuous second inner diameter defined throughout said upper portion, wherein said upper portion extends from said top end of said filter element to said bottom portion to define an upper predetermined volume between said upper portion of said outer cover and said filter element, and said second inner diameter being smaller than said first inner diameter, wherein the level of fluid within said housing provides a visual indicator as to the overall condition of the filter element.

2. The apparatus stated in claim 1, further comprising:

said level of said fluid rising above said lower predetermined volume between said cover of said housing and said cover of said filter element when said filter element is substantially clean.

3. The apparatus stated in claim 1, further comprising:

said outer cover of said housing having integral ribs formed therein for structurally supporting said outer cover.

4. The apparatus stated in claim 1, further comprising:

said top of said filter element having an aperture whereby said relief valve opens and closes said aperture in response to a predetermined pressure differential across said filter element; and a strip of thermal sensitive material having one end connected to said top of said filter element and a second end having a seal connected thereto, and said strip moving from a sealed, closed position, wherein said strip contracts when the temperature within said housing is below a predetermined temperature such that said seal closes said aperture, and an open position, wherein said strip expands when the temperature within said housing is above a predetermined temperature such that said seal disengages said aperture.

5. The apparatus stated in claim 1, wherein the ratio of said lower predetermined volume to said upper predetermined volume is at least approximately 2.7.

6. The apparatus stated in claim 1, further comprising:
a first clearance distance defined between said bottom portion of said outer cover and said cover of said filter element; and
a second clearance distance defined between said upper portion of said outer cover of said housing and said cover of said filter element, wherein the ratio of said first clearance distance to said second clearance distance is at least approximately 3.3.

7. A method for filtering a highly pressurized fluid, wherein the fluid is pressurized by a pump upstream of said apparatus, the steps comprising:
providing a vertical housing having a transparent outer cover, a fluid inlet, and a fluid outlet;
providing a filter element within said housing between said fluid inlet and said fluid outlet wherein said filter element has a cover disposed on said filter element to define a fluid impervious region of said filter element adjacent to a top end of said filter element and a fluid permeable region of said filter element adjacent to a bottom end of said filter element;
providing a relief valve on top of said filter element, and said relief valve opening at a predetermined pressure;
establishing a lower predetermined volume between a bottom portion of said outer cover and said filter element, said bottom portion having a substantially continuous first inner diameter defined throughout said bottom portion and said bottom portion extending at least from said bottom end of said filter element to said fluid impervious region of said filter element;
establishing an upper predetermined volume between an upper portion of said outer cover and said filter element, said upper portion having a substantially continuous second inner diameter defined throughout said upper portion, said upper portion extending from said top end of said filter element to said bottom portion, and said second inner diameter is smaller than said first inner diameter; and
supplying a highly pressurized fluid to said fuel inlet and allowing said pressurized fuel to exit through said fuel outlet wherein a volume of air is determined within said housing by the relationship $PV=nRT$, wherein P is pressure, V is volume, n is the number of molecules, R equals the gas constant, and T is the temperature, and wherein a level of said fluid within said housing provides a visual indicator as to the overall condition of the filter element.

8. The method stated in claim 7, wherein the steps further comprise:
establishing said level of said fluid above said lower predetermined volume in said housing when said filter element is substantially clean.

9. The method stated in claim 7, wherein the steps further comprise:
structurally supporting said outer cover of said housing with integral ribs formed therein.

10. The method stated in claim 7, wherein the steps further comprise:
providing a conventional diesel fuel as said fluid.

11. The method stated in claim 10, wherein the steps further comprise:
pressurizing said diesel fuel between approximately 116 psi and approximately 188 psi.

12. The method stated in claim 11, wherein the steps further comprise:
establishing said volume of air in a range between approximately 3.65 cubic inches and approximately 2.25 cubic inches.

13. The method stated in claim 7, wherein the steps further comprise:
providing a conventional motor oil as said fluid.

14. The method stated in claim 13, wherein the steps further comprise:
pressurizing said motor oil between approximately 60 psi and approximately 80 psi.

15. The method stated in claim 14, wherein the steps further comprise:
establishing said volume of air in a range between approximately 4.06 cubic inches and approximately 3.04 cubic inches.

16. The method stated in claim 7, wherein the steps further comprise:
providing an aperture in said top of said filter element whereby said relief valve opens and closes said aperture in response to a predetermined pressure differential across said filter element; and
providing a strip of thermal sensitive material connected to said top of said filter element and having a seal connected thereto, wherein said strip contracts in response to when the temperature within the housing is below a predetermined temperature such that said seal engages and closes said aperture, and wherein said strip expands in response to the temperature within the housing being above a predetermined temperature such that said seal disengages said aperture.

17. The method stated in claim 7, wherein the ratio of said lower predetermined volume to said upper predetermined volume is at least approximately 2.7.

18. The method stated in claim 7, wherein a first clearance distance is defined between said bottom portion of said outer cover and said cover of said filter element, and a second clearance distance is defined between said upper portion of said outer cover of said housing and said cover of said filter element, wherein the ratio of said first clearance distance to said second clearance distance is at least approximately 3.3.

* * * * *

UNITED STATES PATENT AND TRADEMARK OFFICE
CERTIFICATE OF CORRECTION

PATENT NO.         : 7,393,455 B1                                             Page 1 of 1
APPLICATION NO. : 10/813828
DATED              : July 1, 2008
INVENTOR(S)        : Tondreau et al.

It is certified that error appears in the above-identified patent and that said Letters Patent is hereby corrected as shown below:

1. In Col. 2, line 32, please delete "fuel" and insert -- fluid --;

2. In Col. 3, line 32, please delete "fuel" and insert -- fluid --;

3. In Col. 5, line 37, please delete "fuel" and insert -- fluid --;

4. In Col. 5, line 44, please delete "57" and insert -- 58 --;

5. In Col. 5, line 45, please delete "57" and insert -- 58 --;

6. In Col. 5, line 52, please delete "57" and insert -- 58 --; and

7. In Col. 5, line 53, please delete "57" and insert -- 58 --.

Signed and Sealed this

Nineteenth Day of August, 2008

JON W. DUDAS
*Director of the United States Patent and Trademark Office*